United States Patent Office 3,268,630 Patented August 23, 1966

3,268,630
PREPARATION OF HYDROXYPHENYL ALKANE PHOSPHONATES

John D. Spivack, Spring Valley, N.Y., assignor to Geigy Chemical Corporation, Greenburgh, N.Y., a corporation of Delaware No Drawing. Filed Feb. 25, 1963, Ser. No. 260,910
23 Claims. (Cl. 260—968)

This invention relates to a novel and useful process for the preparation of certain substituted phosphonate derivatives containing phenolic groups, in particular hindered phenolic groups having at least one bulky alkyl substituent in a position ortho to the hydroxyl group in the phenolic radical, e.g. a tertiary butyl group. Of particular advantage is the process for the preparation of disubstituted (3,5-dialkyl-4-hydroxybenzyl) phosphonates.

The disubstituted hindered phenolic phosphonates with which this invention deals are valuable stablizers. They have been found to be superior antioxidants for use in gasoline, kerosine, and other hydrocarbon fuels, hydrocarbon and oxygenated solvents, etc., as well as in lubricating and other industrial oils, petroleum wax, rubber and rubber-like materials, normally liquid olefinic material, normally solid polyolefinic materials such as polypropylene and polyethylene, as well as a wide range of other polymeric materials.

An object of this invention is to provide a novel chemical process for preparing the above phosphonates. A further object is to provide a process which comprises reacting certain 3,5-dialkyl-4-hydroxybenzyl alcohols with a triaryl phosphite. Other important objects of this invention will be apparent from the ensuing description.

The above and other objects of this invention are accomplished by providing a process which comprises reacting a compound of the formula $$Ar-X-OH \qquad (I)$$

wherein

Ar is a hydroxyphenyl radical having one or two alkyl groups ortho to the hydroxy group on the phenyl nucleus, and X is an alkylene group having from 1 to 6 carbon atoms, preferably a group of the formula —CHY—, wherein Y is an alkyl group having 1 to 5 carbon atoms, with a phosphite of the formula $$P(R)_3 \qquad (II)$$

wherein the R groups are independently alkoxy, or phenoxy and alkyl substituted phenoxy.

The preferred starting material in the process of the invention for compound I above, is a (3-tertiary alkyl-4-hydroxy-substituted phenyl)methanol derivative, or a similar derivative of ethanol or a propanol.

The preferred starting material in the process of the invention for compound II above, is triphenyl phosphite or tri(alkylphenyl)phosphite, each of said alkylphenyl groups having from 1 to 24 carbon atoms therein, or a trialkyl phosphite, each of said alkyl groups having 1 to 24 carbon atoms therein.

The compounds of the Formula I above may be prepared directly by reaction of the ortho substituted phenol with an aldehyde such as formaldehyde, or by hydrolysis of the corresponding aryl-substituted alkyl halide, which is in turn prepared from the appropriate alkyl phenol, formaldehyde and hydrogen halide.

The compounds of the Formula II above may be prepared by reaction of a suitable alcohol with phosphorus trichloride in the presence of base, e.g. pyridine. For example, tri-n-dodecyl phosphite may be prepared by the reaction of n-dodecanol with phosphorus trichloride in the presence of base, e.g. pyridine, or by transesterification of a triarylphosphite with n-dodecanol.

The substituted phosphite of the Formula II and the arylalkanol of the Formula I are preferably present in substantially equimolar quantities. The phosphite may also be present in molar excess, e.g. up to 10 times the molar concentration of the arylalkanol of the Formula I, or the arylalkanol I may be in excess.

There is no special order in which the reactants need be mixed. The reaction will proceed equally well when the arylalkonal is added to the phosphite or when the phosphite is added to said alkanol.

It is a particular advantage of the process according to the present invention that one of the by-products of this process is a material useful in preparation of one of the starting materials of the process. For example, in the reaction of trioctadecyl phosphite with 3,5-ditert.butyl-4-hydroxybenzyl alcohol, there is produced the by-product octadecanol, which may be used directly in turn for production of the starting material trioctadecyl phosphite by known procedures, such as reaction of octadecanol with phosphorus trichloride. Thus, an integrated process is possible with maximum economy in the use of material used. In a similar way, by-product phenol and alkyl phenols may be used directly for production of triphenyl phosphite or tri(alkylphenyl)phosphites which are starting materials in the reaction of said phosphites with said benzyl alcohol.

A further advantage of the process according to the invention is that the starting materials are all relatively stable materials and, therefore, particularly advantageous for use in large-scale commercial plants.

The solvents used in the practice of this invention may be any one of the aromatics having from 6 to 12 carbon atoms such as benzene, toluene, xylene, mesitylene and hexylbenzene; any of the saturated hydrocarbons and their isomers having 5 to 19 carbon atoms such as pentane, hexane, isooctane, dodecane, hexadecane and nonadecane; aliphatic carboxylic alkyl esters; glycol diethers, such as the diethers of the lower glycols such as ethylene glycol dimethyl ether and ethylene glycol diamyl ether; or the simple ethers or non-reactive solvents generally. Neutral phosphate esters are also useful.

The use of the above solvents is not essential under all conditions and the reaction proceeds in good yield even in the absence of such solvents.

The temperatures employed vary from about 20° C. to the reflux temperature of the highest boiling solvent, about 300° C. at reaction times of less than one-half hour to one week or more to give good yield of product.

A preferred temperature range is from about 100° C. to about 250° C. since the reaction proceeds at a sufficiently rapid rate at this temperature range to give a good yield of product in a reasonable time with a minimum of undesirable side reactions.

Although good results are obtained throughout the temperature and time ranges stated above, preferred reaction times are from about 0.5 hour to about 24 hours. These reaction times give especially good results.

Pressure below atmospheric may be employed and is especially desirable when using a higher alkyl phosphite as a reactant since it simplifies isolation of product. This also results in tending toward driving the reaction to completion. Superatmospheric pressures may also be advantageous, as for example, when low boiling solvents are used.

Stirring the reaction mixture facilitates the reaction but is not essential to the process, especially when refluxing the reaction mixture.

Although the reaction in some cases proceeds very well without use of a catalyst, in other cases it is advantageous to use catalysts with the reaction of a phosphite and alkanol, such as alkali metal halides, alkyl halides, halogens, and Lewis acid halides, e.g. potassium iodide, octadecyl iodide, iodine or boron trifluoride.

The compounds produced by the practice of this invention have the formula:

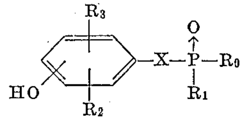

(III)

wherein $R_0$ represents alkoxy, phenoxy, alkylphenoxy,
$R_1$ represents alkoxy, phenoxy, alkylphenoxy,
$R_2$ represents alkyl,
$R_3$ represents alkyl or hydrogen, and
X is defined as above.

In the Formula III, some illustrative groups represented by $R_0$ or $R_1$ are alkylphenoxy groups having from 7 to 24 carbon atoms, i.e., methylphenoxy, ethylphenoxy, propylphenoxy, butylphenoxy, pentylphenoxy, hexylphenoxy, heptylphenoxy, octylphenoxy, nonylphenoxy, decylphenoxy, undecylphenoxy, dodecylphenoxy, tridecylphenoxy, tetradecylphenoxy, pentadecylphenoxy, hexadecylphenoxy, heptadecylphenoxy, octadecylphenoxy, isopropylphenoxy, dibutylphenoxy, tributylphenoxy, dinonylphenoxy; alkoxy groups having from 1 to 24 carbon atoms, i.e. methoxy, ethoxy, isopropoxy, propoxy, butoxy, secondary butoxy, tertiary butoxy, pentoxy, hexoxy, heptoxy, octyloxy, nonyloxy, decyloxy, undecyloxy, dodecyloxy, tridecyloxy, tetradecyloxy, pentadecyloxy, hexadecyloxy, heptadecyloxy, octadecyloxy, nonadecyloxy, eicosoxy, heneicosoxy, docosoxy, tricosoxy, tetracosoxy.

Some illustrative groups for $R_2$ and $R_3$ are alkyl groups, e.g. alkyl having from 1 to 18 carbon atoms, preferably having from 1 to 6 carbon atoms, especially tertiary butyl; also methyl, ethyl, n-propyl, isopropyl, n-butyl, secondary butyl, pentyl, hexyl, heptyl, octyl, nonyl, decyl, undecyl, dodecyl, tridecyl, tetradecyl, pentadecyl, hexadecyl, heptadecyl, octadecyl, at least one alkyl group being ortho to the phenolic hydroxyl.

In another aspect of the invention, in some cases the process for preparing compounds of the formula

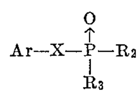

(IV)

wherein $R_2$ and $R_3$ are independently alkoxy having 1 to 24 carbon atoms or alkylphenoxy having 7 to 24 carbon atoms, and
Ar and X are defined as above, is improved by transesterification of

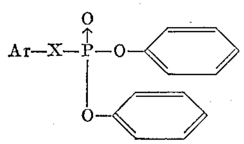

(V)

with an aliphatic alcohol having 1 to 24 carbon atoms or an alkylphenol having 7 to 24 carbon atoms. The reaction is assisted by base catalysts such as alkali metal phenoxides or alkali metal alkoxides; alkali metal borates are also useful. The reaction proceeds in the absence of solvents, but the use of solvents is possible and may be advantageous in some circumstances. Generally, inert solvents, such as those mentioned above in connection with the reaction of tri-substituted phosphite with compound (I), Ar—X—OH, may be used.

Use of the compound

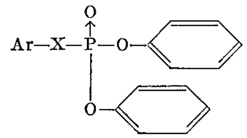

(V)

as an intermediate presents advantages in cases where direct preparation of the desired end product by reaction with suitable phosphite and Ar—X—OH might involve problems of purification and separation in that the starting materials are oils not easily separated from the product oils. When the compound

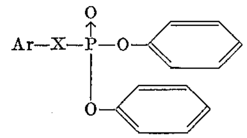

(V)

is crystalline, easy separation and purification makes advantageous the use of this compound as an intermediate.

Thus, in preparing compounds of the formula

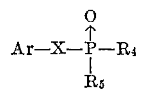

(VI)

wherein

Ar and X are defined above, and
$R_4$ and $R_5$ are each independently alkylphenoxy having 7 to 24 carbon atoms, it is advantageous to first prepare (V) by reaction of triphenyl phosphite and (I), Ar—X—OH, to give (V), thereafter reacting (V) with an alkylphenol having 7 to 24 carbon atoms in order to obtain (VI). When (V) is crystalline, any unreacted (V) may be easily separated from the product (VI) which may often possess different solubility characteristics.

The following examples illustrate the practice of this invention according to the method outlined above. In the examples, unless otherwise noted, parts are by weight and temperatures are expressed in degrees centigrade. The relationship of parts by weight to parts by volume is as that of grams to cubic centimeters. The examples are illustrative of the invention but are not meant to limit the scope of the invention in any way.

*Example I.—Reaction of triphenylphosphite and 3,5-di-t-butyl-4-hydroxybenzyl alcohol*

63 parts of triphenyl phosphite and 47.0 parts of 3,5-di-t-butyl-4-hydroxybenzyl alcohol are heated under nitrogen at 175°–181° for 3½ hours. After this heating period, 20.3 parts of phenol are recovered by distillation. The resulting diphenyl-3,5-di-t-butyl - 4 - hydroxybenzyl phosphonate is recovered as a light colored glass, which melts at 135°–137° after recrystallization from carbon tetrachloride.

If 71.5 parts of tri-p-tolyl phosphite and 50.0 parts of 2-hydroxy-3-t-octyl-5-methyl-benzyl alcohol are reacted substantially as described in Example II, then di-p-tolyl-2-hydroxy-3-t-octyl - 5 - methylbenzyl phosphonate is recovered.

*Example II.—Reaction of tri(p-t-octylphenyl)phosphite and 3,5-di-t-butyl-4-hydroxybenzyl alcohol*

34.8 parts of tri(p-t-octylphenyl)phosphite (95%) are heated in a nitrogen atmosphere with 11.6 parts of 3,5-di-t-butyl-4-hydroxybenzyl alcohol and 0.75 parts of potassium iodide over a period of 4½ hours at 180°–200°. The by-product p-t-octylphenol is removed from the reaction by distillation at a vapor temperature of 110°–120° at 2 mm. Hg pressure. The resulting di-(p-t-octylphenyl)-3,5-di-t-butyl-4-hydroxybenzylphosphonate is thus recovered as a light colored viscous oil which solidifies almost to a glass on cooling.

If 54.3 parts of tri-p-octadecylphenyl phosphite and 21.5 parts of 3-t-butyl-4-hydroxy-5-n-octadecyl-benzyl alcohol are reacted as in Example II, then di-(p-octadecylphenyl)-3-t-butyl-4-hydroxy-5 - n - octadecylbenzylphosphonate is produced.

*Example III.—Reaction of trioctadecylphosphite and 3,5-di-t-butyl-4-hydroxybenzyl alcohol*

93.0 parts of trioctadecylphosphite (95%) are heated with 23.6 parts of 3,5-di-t-butyl-4-hydroxybenzyl alcohol at 175°–185° in an atmosphere of $N_2$ for 3 hours. The residue is then topped by molecular distillation of the by-product octadecanol as well as other impurities at a mantle temperature of 245° at a pressure of 1 micron Hg. 83.6 parts of residue from the molecular distillation are crystallized from n-heptane to yield 63.5 parts of di-n-octadecyl-3,5-di-t-butyl-4-hydroxybenzyl phosphonate (yield 79% of theory).

The following table illustrates yields possible when the reaction is carried out in a similar fashion with conditions varied.

| Trioctadecyl Phosphite, moles | 3,5-di-t-butyl-4-hydroxybenzyl alcohol | | | Catalyst Systems, Moles | Yield percent of theory (Cryst. prod.) |
|---|---|---|---|---|---|
| | Moles | Time, hrs. | Temp. | | |
| 0.100 | 0.10 | 4½ | (175–183°) | KI-(0.01) | 69 |
| 0.105 | 0.10 | 5 | (170–185°) | KI-(0.01); n-$C_{18}H_{37}Cl$ (0.005). | 78 |
| 0.105 | 0.10 | 3 | (155–165°) | n-$C_{16}H_{33}I$ (0.005). | 67 |
| 0.105 | 0.10 | 3 | (155–160°) | $I_2$ (0.005) | 68 |
| 0.105 | 0.10 | 17 | (75–100°) | None | >50 |
| | | 22 | (125°) | do | 77 |
| 0.105 | 0.10 | 6½ | (70–80°) | $BF_3$ (0.005) | 44 |
| 0.105 | 0.10 | 2½ | (175–180°) | None | 83 |

If 107 parts of tri-n-docosylphosphite and 20.8 parts 1-(3-t-butyl-4 - hydroxy - 5 - methylphenyl) - ethanol are reacted together substantially as described in Example III, then di-n-docosyl-1-(3-t-butyl-4-hydroxy-5-methylphenyl)-ethanephosphonate is produced.

If 61.5 parts of trilauryl phosphite and 26.4 parts of 1-(3-t-butyl-4-hydroxy-5-n - ethylphenyl) - n - hexanol are reacted together substantially as described in Example III, then di-n-dodecyl-1-(3-t-butyl-4-hydroxy - 5 - methylphenyl)-n-hexanephosphonate is produced.

*Example IV.—Reaction of trimethyl phosphite and 3,5-di-t-butyl-4-hydroxybenzyl alcohol*

(a) 37.2 parts of trimethyl phosphite and 70.5 parts of 3,5-di-t-butyl-4-hydroxybenzyl alcohol are stirred and heated under nitrogen at 75°–80° and then the temperature raised gradually to 125° over a period of 30 minutes. The reaction mixture is then heated at 125°–170° over a period of 2¾ hours during which 9.6 parts by volume of methanol are collected by distillation. The yield of product is almost quantitative. The reaction mixture solidifies rapidly on cooling and is purified further by crystallization from solvent mixtures of benzene and n-heptane. The dimethyl-3,5-di-t-butyl-4-hydroxybenzyl phosphonate is obtained as white crystals melting at 158°–160°.

(b) The reaction mixture was also run in the presence of potassium iodide with substantially similar results as far as identity and yield of products are concerned. On initial mixing at room temperature, however, an exothermic reaction took place which caused a rise in temperature to about 65°. It may also be noted, however, that the color of the uncatalyzed reaction mixture is almost colorless during much of the reaction period and is also easier to make colorless by crystallization.

Thus, it is seen that the process of the invention proceeds without catalytic agents in many cases. In some cases it is preferred not to use such catalysts because the product is often more difficult to purify when such catalysts are employed.

*Example V.—Reaction of diphenyl-3,5-di-t-butyl-4-hydroxybenzyl phosphonate with n-octadecanol*

13.55 parts of n-octadecanol are melted under nitrogen at 70°. To this melt are added 11.31 parts of diphenyl-3,5-di-t-butyl-4-hydroxybenzylphosphonate. 0.27 part of sodium methylate are then added all at once and the reaction mixture is heated and stirred at reflux for 1 hour at 185°, then at 200° for 1 hour and finally at 210°–215° for 2 hours. 4.2 parts of phenol (89% of theory) are recovered by distillation at 15 mm. Hg pressure. The reaction mixture is heated at 215° at the same pressure for an additional two hours. The reaction mixture is then cooled and dissolved in 60 parts by volume of acetone, the acetone solution being made slightly acid by a few drops of glacial acetic acid. The white crystals melted at 54°–57° and weighed 14 parts after filtration and drying. The yield of di-n-octadecyl-3,5-di-t-butyl-4-hydroxybenzylphosphonate is thus 70% of theory. In the same manner, other catalysts, e.g. sodium phenoxide and sodium tetraborate, are used with somewhat lower yields.

If 6.5 parts of n-octanol and 12.0 parts of ditolyl-3,5-di-t-butyl-4-hydroxybenzylphosphonate are reacted substantially as described in Example V, then di-n-octyl-3,5-di-t-butyl-4-hydroxybenzylphosphonate is produced.

*Example VI.—Reaction of p-t-octylphenol with diphenyl-3,5-di-t-butyl-4-hydroxybenzyl phosphonate*

10.3 parts of p-t-octylphenol are warmed for 2 minutes at 90° together with 0.27 part of sodium methylate and 11.3 parts of diphenyl-3,5-di-t-butyl-4-hydroxybenzyl phosphonate are added. The reactants are then heated at 180° at 100 to 200 mm. Hg pressure for 4 hours. The pressure is then reduced and 4.7 parts of phenol distilled at 190° and 15 mm. Hg pressure. The di-p-t-octylphenyl-3,5-di-t-butyl-4-hydroxybenzylphosphonate is thus isolated as a glassy residue. The product is purified by elution chromatography over silica gel.

What I claim is:

1. The process for preparing a compound having the formula

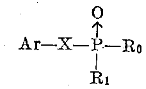

wherein

Ar is an alkyl-substituted hydroxyphenyl radical, at least one alkyl group being tertiary alkyl ortho to the hydroxy group on the phenyl nucleus, said alkyl having up to 18 carbon atoms, X is an alkylene group having 1 to 6 carbon atoms, and $R_0$ and $R_1$ are each independently selected from the group consisting of alkoxy having 1 to 24 carbon atoms, phenoxy and alkylphenoxy having 7 to 24 carbon atoms, which process comprises (a) reacting a compound having the formula Ar—X—OH

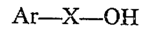

wherein Ar and X are defined as above, with a compound having the formula wherein R is a member selected from the group consisting of alkoxy having 1 to 24 carbon atoms, phenoxy and alkylphenoxy having 7 to 24 carbon atoms, and (b) recovering the product.

2. The process of claim 1, wherein each R is phenoxy.

3. The process of claim 1, wherein each R is alkylphenoxy having 7 to 24 carbon atoms.

4. The process of claim 1, wherein each R is p-tertiary-octylphenoxy.

5. The process of claim 1, wherein each R is alkoxy having 1 to 24 carbon atoms.

6. The process of claim 1, wherein each R is octadecyloxy.

7. The process of claim 1, wherein each R is methoxy.

8. The process of claim 1, wherein Ar is 3,5-di-tertiary butyl-4-hydroxyphenyl.

9. The process of claim 1, wherein X is methylene.

10. The process for the preparation of compounds of the formula

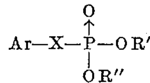

wherein

Ar is an alkyl-substituted hydroxyphenyl radical having at least one alkyl group ortho to the hydroxy group on the phenyl nucleus, said alkyl having 1 to 18 carbon atoms, X is alkylene of 1 to 6 carbon atoms, R′ and R″ are each independently alkyl having 1 to 24 carbon atoms, said process comprising the steps of (a) reacting a compound of the formula

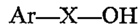

wherein Ar and X are defined as above, with a compound of the formula

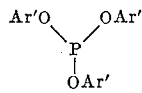

wherein Ar′ is a member selected from the group consisting of phenyl and alkylphenyl having 7 to 24 carbon atoms, (b) recovering the product

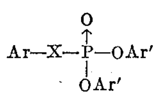

wherein Ar, X, and Ar′ are defined as above, (c) reacting $$Ar—X—\overset{O}{\underset{OAr'}{P}}—OAr'$$

wherein Ar, X and Ar′ are defined as above, with a compound of the formula

R‴OH wherein R‴ is an alkyl group having 1 to 24 carbon atoms, and (d) recovering the product.

11. The process of claim 10, wherein Ar—X—OH is 3,5-ditertiarybutyl-4-hydroxybenzyl alcohol.

12. The process of claim 11, wherein $$\begin{matrix} Ar'O & & OAr' \\ & P & \\ & OAr' & \end{matrix}$$

is triphenylphosphite.

13. The process of claim 11, wherein

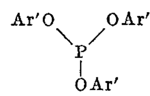

is tri(p-tertiaryoctylphenyl)phosphite.

14. In the process for the preparation of a compound of the formula

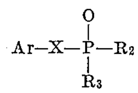

wherein

Ar is an alkyl-substituted hydroxyphenyl radical having at least one alkyl group ortho to the hydroxy group on the phenyl nucleus, said alkyl having 1 to 18 carbon atoms, X is alkylene of 1 to 6 carbon atoms, $R_2$ and $R_3$ are each independently selected from the group consisting of alkoxy having 1 to 24 carbon atoms and alkylphenoxy having 7 to 24 carbon atoms, the improvement which consists in (a) reacting a compound of the formula

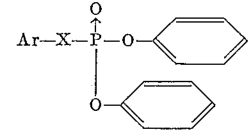

wherein Ar and X are defined as above, with a compound selected from the group consisting of aliphatic alcohols having 1 to 24 carbon atoms, and alkyl phenols having 7 to 24 carbon atoms, and (b) recovering the product.

15. The process of claim 14, wherein an alkanol having 1 to 24 carbon atoms is employed as reactant.

16. The process of claim 14, wherein octadecyl alcohol is reactant.

17. The process of claim 14, wherein an alkylphenol having 7 to 24 carbon atoms is reactant.

18. The process of claim 14, wherein p-t-octylphenol is reactant.

19. The process of claim 14, wherein Ar is 3,5-di-tertiary butyl-4-hydroxyphenyl.

20. The process of claim 14, wherein X is methylene.

21. A process for preparing a compound having the formula

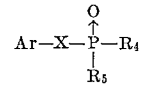

wherein

Ar is an alkyl-substituted hydroxyphenyl radical, at least one alkyl group being tertiary alkyl ortho to the hydroxy group on the phenyl nucleus, said alkyl having up to 18 carbon atoms, X is an alkylene group having 1 to 6 carbon atoms, and $R_4$ and $R_5$ are each independently alkylphenoxy having 7 to 24 carbon atoms, said process comprising (a) reacting a compound having the formula Ar—X—OH wherein Ar and X are defined as above, with triphenylphosphite, (b) recovering the intermediate product

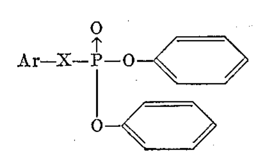

wherein Ar and X are defined as above, (c) reacting said intermediate product with an alkylphenol having 7 to 24 carbon atoms, and (d) recovering the final product

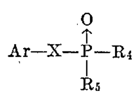

wherein Ar, X, $R_4$ and $R_5$ have the meanings given above.

22. The process of claim 21, wherein Ar—X—OH is 3,5-ditertiarybutyl-4-hydroxybenzyl alcohol.

23. The process of claim 21, wherein the alkylphenol of step (c) is p-t-octylphenol.

References Cited by the Examiner

Cason et al., "Chem. Abst.," vol. 53, col. 15953–15954 (1959).

CHARLES B. PARKER, *Primary Examiner.*

FRANK SIKORA, *Assistant Examiner.*